United States Patent
Aoyama et al.

(10) Patent No.: US 12,293,878 B2
(45) Date of Patent: May 6, 2025

(54) ELECTROLYTIC CAPACITOR AND PRODUCTION METHOD THEREFOR

(71) Applicant: Panasonic Intellectual Property Management Co., Ltd., Osaka (JP)

(72) Inventors: Tatsuji Aoyama, Kyoto Fu (JP); Shumpei Matsushita, Yamaguchi Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 131 days.

(21) Appl. No.: 18/247,068

(22) PCT Filed: Sep. 27, 2021

(86) PCT No.: PCT/JP2021/035384
§ 371 (c)(1),
(2) Date: Mar. 28, 2023

(87) PCT Pub. No.: WO2022/071223
PCT Pub. Date: Apr. 7, 2022

(65) Prior Publication Data
US 2023/0411085 A1 Dec. 21, 2023

(30) Foreign Application Priority Data
Sep. 29, 2020 (JP) .................. 2020-163505

(51) Int. Cl.
*H01G 9/02* (2006.01)
*H01G 9/028* (2006.01)
*H01G 9/035* (2006.01)
*H01G 9/042* (2006.01)

(52) U.S. Cl.
CPC ............... *H01G 9/02* (2013.01); *H01G 9/028* (2013.01); *H01G 9/035* (2013.01); *H01G 9/042* (2013.01)

(58) Field of Classification Search
None
See application file for complete search history.

(56) References Cited

U.S. PATENT DOCUMENTS

| | | | |
|---|---|---|---|
| 2004/0240155 A1* | 12/2004 | Miltich | H01G 9/022 361/512 |
| 2012/0328941 A1* | 12/2012 | Hosoe | H01M 10/399 29/874 |
| 2016/0172117 A1 | 6/2016 | Kubo et al. | |

(Continued)

FOREIGN PATENT DOCUMENTS

| JP | 2005-294505 A | 10/2005 |
|---|---|---|
| JP | 2007-149733 A | 6/2007 |

(Continued)

OTHER PUBLICATIONS

International Search Report dated Dec. 7, 2021 issued in International Patent Application No. PCT/JP2021/035384, with English translation.

*Primary Examiner* — Eric W Thomas
(74) *Attorney, Agent, or Firm* — Rimon P.C.

(57) ABSTRACT

Disclosed is an electrolytic capacitor including an anode body, a dielectric layer formed on the anode body, a cathode body, and a separator and an electrolyte that are disposed between the dielectric layer and the cathode body. At least part of the separator is coated with a conductive metal oxide.

8 Claims, 2 Drawing Sheets

(56) References Cited

U.S. PATENT DOCUMENTS

2017/0271085 A1* 9/2017 Tsubaki .................. H01G 9/15
2019/0326610 A1 10/2019 Takata
2020/0176742 A1* 6/2020 Fukunaga ........... H01M 50/461

FOREIGN PATENT DOCUMENTS

| JP | 2017-027950 A | 2/2017 | |
|---|---|---|---|
| JP | 2017-168696 A | 9/2017 | |
| JP | 2019-192436 A | 10/2019 | |
| WO | 2015/033566 A1 | 3/2015 | |
| WO | WO-2019089492 A1 * | 5/2019 | ............. H01G 11/52 |

* cited by examiner

ELECTROLYTIC CAPACITOR AND PRODUCTION METHOD THEREFOR

CROSS-REFERENCE OF RELATED APPLICATIONS

This application is the U.S. National Phase under 35 U.S.C. § 371 of International Patent Application No. PCT/JP2021/035384, filed on Sep. 27, 2021, which in turn claims the benefit of Japanese Patent Application No. 2020-163505, filed on Sep. 29, 2020, the entire disclosures of which Applications are incorporated by reference herein.

TECHNICAL FIELD

The present disclosure relates to an electrolytic capacitor and a production method thereof.

BACKGROUND ART

Electrolytic capacitors are used in various fields. In recent years, electrolytic capacitors have been required to be highly reliable, and, in particular, to suppress degradation at high temperatures.

PTL 1 (WO 2015/033566) discloses "an electrical storage device comprising: an electrical storage element including: an anode body; a cathode body facing the anode body; a separator that includes a separator substrate and a conductive polymer attached to the separator substrate, and is interposed between the anode body and the cathode body; and an electrolytic solution with which the electrical storage element is impregnated, wherein the separator includes a first surface layer having a first surface facing the anode body, and a second surface layer having a second surface facing the cathode body, the first surface layer includes a first region in which the conductive polymer is not attached, and the second surface layer includes a second region in which the conductive polymer is attached."

PTL 2 (Japanese Laid-Open Patent Publication No. 2007-149733) disclose "a wound electrolytic capacitor comprising an anode foil, a separator, and a cathode material, wherein a separator having a conductive thin film formed on one side thereof is used as the cathode material" PTL 2 describes that "According to the present invention, a conductive thin film is formed on one side of a separator, and the separator thus functions both as a separator and a cathode. This eliminates the need for a conventionally used cathode foil, so that a configuration composed of an anode foil, a separator, a cathode foil, and a separator can be replaced by a configuration composed of an anode foil, a separator, and a single-sided conductive separator, thus reducing the thickness per winding. Accordingly, it is possible to realize size reduction as compared with conventional wound electrolytic capacitors."

CITATION LIST

Patent Literatures

[PTL 1] WO 2015/033566
[PTL 2] Japanese Laid-Open Patent Publication No. 2007-149733

SUMMARY OF INVENTION

Technical Problem

At present, there is a need for electrolytic capacitors that suppress the deterioration in characteristics even at high temperatures. In particular, there is a need for electrolytic capacitors that experience a smaller increase in the equivalent series resistance (ESR) even at high temperatures. Under such circumstances, an object of the present disclosure is to provide an electrolytic capacitor that suppresses the deterioration in characteristics even at high temperatures.

Solution to Problem

An aspect of the present disclosure relates to an electrolytic capacitor. The electrolytic capacitor includes: an anode body; a dielectric layer formed on the anode body; a cathode body; and a separator and an electrolyte that are disposed between the dielectric layer and the cathode body, wherein at least part of the separator is coated with a conductive metal oxide.

Another aspect of the present disclosure relates to a production method of an electrolytic capacitor. The production method is a production method of an electrolytic capacitor including: an anode body; a dielectric layer formed on the anode body; a cathode body; a separator; and an electrolyte, the method including step (i) of forming a capacitor element by arranging the anode body, the cathode body, the separator, and the electrolyte such that the separator and the electrolyte are disposed between the dielectric layer and the cathode body, wherein at least part of the separator is coated with a conductive metal oxide.

Advantageous Effects of Invention

According to the present disclosure, it is possible to obtain an electrolytic capacitor that suppresses the deterioration in characteristics even at high temperatures.

While the novel features of the invention are set forth in the appended claims, the invention, both as to organization and content, will be better understood and appreciated, along with other objects and features thereof, from the following detailed description taken in conjunction with the drawings.

DESCRIPTION OF EMBODIMENT

Figure 1:
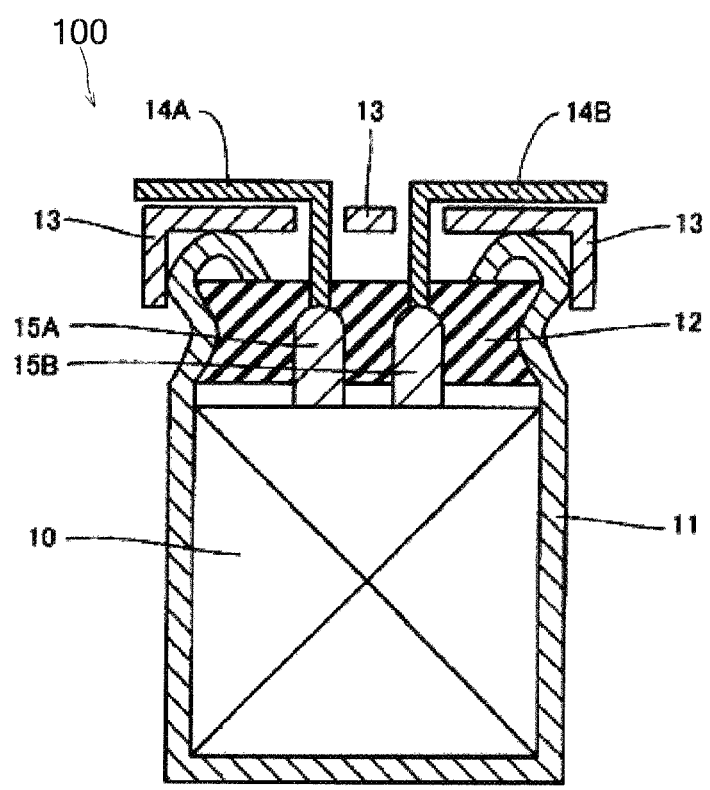
FIG. 1 is a cross-sectional view schematically showing an exemplary electrolytic capacitor according to the present disclosure.

Hereinafter, an exemplary embodiment according to the present disclosure will be described. In the following, embodiments of the present disclosure will be described by way of examples. However, the present disclosure is not limited to the examples described below. Although examples of specific numerical values and materials may be given in the following description, other numerical values and materials may be used as long as the effects of the present disclosure can be achieved. As used herein, in the expression "the range of a numerical value A to a numerical value B", this range includes the numerical value A and the numerical value B.

(Electrolytic Capacitor)

An electrolytic capacitor according to the present embodiment includes: an anode body; a dielectric layer formed on the anode body; a cathode body; and a separator and an electrolyte that are disposed between the dielectric layer and the cathode body. At least part of the separator is coated with a conductive metal oxide. The metal oxide may be hereinafter referred to as a "metal oxide (M)".

As a result of studies, the present inventors have acquired a new knowledge that an electrolytic capacitor that suppresses degradation at high temperatures can be obtained by using a separator coated with a metal oxide (M). The present disclosure is based on this new knowledge. Some conductive metal oxides (M), such as indium tin oxide, may exhibit higher conductivity than conductive polymers described below. Furthermore, the metal oxide (M) are is highly resistant to heat, and experiences a smaller decrease in conductivity caused by heat. Therefore, an electrolytic capacitor that suppresses degradation (e.g., increase in ESR) at high temperatures can be obtained by using a separator coated with the metal oxide (M).

The strength and heat resistance of the separator can be increased by coating the separator with the metal oxide (M). Therefore, with the electrolytic capacitor according to the present disclosure, it is possible prevent the interval between plates of the anode body and the cathode body from being narrowed due to deterioration of the separator caused by heat. As a result, it is possible to suppress deterioration in characteristics (reduction of withstand voltage, increase of leakage current, etc.) due to heat.

The metal oxide (M) may be attached to the separator in the form of particles, or may be attached to the separator in the form of a layer.

The metal oxide (M) includes an oxide of at least one element selected from the group consisting of indium, tin, antimony, and zinc. Examples of the metal oxide (M) include indium tin oxide (ITO), zinc oxide (ZnO), and antimony-doped tin oxide (ATO).

The separator may include synthetic fiber, or may be formed of synthetic fiber. The synthetic fiber is preferable because of the high heat resistance. The synthetic fiber is also preferable because of the high resistance during a step of forming the metal oxide (M). Examples of the material of the synthetic fiber include polyethylene terephthalate, polybutylene terephthalate, polyphenylene sulfide, vinylon, nylon, aromatic polyamide (aramid), polyimide, polyamide imide, and polyetherimide. Among these, aromatic polyamide and nylon are preferable because of the high heat resistance. Alternatively, the separator may include natural fiber, or may be formed of natural fiber. Examples of the material of the natural fiber include cellulose.

The air permeability (air permeation resistance) of the separator may be in the range of 1.0 to 200 sec/100 mL (e.g., the range of 1.5 to 100 sec/100 mL). This range allows the metal oxide (M) to be uniformly formed on the fiber surface inside the separator, thus improving the conductivity inside the separator. Here, the air permeability can be measured using a type-B testing machine (Gurley densometer) in accordance with the section "21.2 Air permeability Method B (Gurley testing method)" prescribed in JIS C2300, for example.

The density of the separator may be substantially the same throughout the separator, or may vary from one location of the separator to another. For example, the density of a portion of the separator on the anode body side may be different from the density of a portion of the separator on the cathode body side. In an example, the density of a portion of the separator on the anode body side is higher than the density of a portion of the separator on the cathode body side. In another example, the density of a portion of the separator on the anode body side is lower than the density of a portion of the separator on the cathode body side. Here, a higher density can be replaced by a lower porosity, and a lower density can be replaced by a higher porosity. When forming a metal oxide (M), the metal oxide (M) more easily permeates the interior of the separator at a portion with a lower density.

The separator whose density varies from one location to another may be formed by a known method, or may be commercially obtained.

The electrolyte may include an electrolytic solution and a conductive polymer. With this configuration, the conductive polymer allows for a further reduction of the electrical resistance between the anode body and the cathode body. Examples of the electrolytic solution and the conductive polymer will be described later.

Alternatively, the electrolyte may be composed of the electrolytic solution without including the conductive polymer. In the electrolytic capacitor according to the present disclosure, a separator coated with a conductive metal oxide (M) is used. Accordingly, with the electrolytic capacitor according to the present disclosure, it is possible to achieve favorable characteristics (e.g., a low ESR) without the conductive polymer. When the conductive polymer is used, it is generally necessary to use an electrolytic solution in which dedoping is less likely to occur, in order to prevent dedoping from the conductive polymer. On the other hand, when the conductive polymer is not used, there is less limitation on the electrolytic solution. For example, when the conductive polymer is not used, an electrolytic solution with a near-neutral pH or an electrolytic solution with a high electrolyte salt concentration can be easily used.

When the electrolyte is composed of an electrolytic solution that does not include any conductive polymer, it is possible to use a low-porosity separator (a high-density separator) that is difficult to be impregnated with a conductive polymer. Use of a low-porosity separator allows the metal oxide (M) to be more uniformly formed on the fiber surface inside the separator, thus increasing the conductivity inside the separator. The porosity of the low-porosity separator may be in the range of 20% to 80% (e.g., the range of 40% to 70%).

Preferably, the cathode body includes a metal foil. Examples of the metal foil will be described later. The inclusion of the metal foil in the cathode body makes it possible to achieve a reduced ESR and an increased capacity. In the electrolytic capacitor according to the present disclosure, at least part of the separator is coated with the metal oxide (M), and therefore the contact resistance between the separator and the cathode body (viewed from another perspective, the contact resistance between the electrolyte and the cathode body) can be reduced in particular.

The electrolytic capacitor may further include a conductive layer formed on a surface of the cathode body on the separator side, the conductive layer including at least one element selected from the group consisting of carbon, titanium, and nickel. With this configuration, it is possible to improve adhesion between the separator and the cathode body, and reduce the contact resistance therebetween in particular. As a result, it is possible to reduce the ESR. These conductive layers may be formed using a paste including particles of these materials (e.g., graphite particles or metal particles), or may be formed by a dry process (evaporation, sputtering, etc.).

An amount of the metal oxide (M) coating a portion of the separator on the cathode body side may be larger than an amount of the metal oxide (M) coating a portion of the separator on the anode body side. With this configuration, the contact resistance between the separator and the cathode body can be reduced in particular.

The amount of the metal oxide (M) coating the separator may be substantially uniform in the thickness direction of the separator, or may be substantially uniform throughout the separator. By coating the entire separator with the metal oxide (M), the ESR, for example, can be reduced in particular.

Examples of constituent elements of the electrolytic capacitor will be described below. However, the constituent elements of the electrolytic capacitor according to the present disclosure are not limited to the following examples.

(Anode Body)

A metal foil having a dielectric layer formed on a surface thereof may be used for the anode body. The type of the metal constituting the metal foil is not particularly limited. In view of the ease of formation of a dielectric layer, examples of the metal constituting the metal foil include valve metals such as aluminum, tantalum, niobium, and titanium, and alloys of valve metals. Preferable examples are aluminum and an aluminum alloy. Generally, the surface of the anode body is roughened (porosified). In that case, a dielectric layer is formed on at least part of the porous surface (roughened surface). The electrolyte is in contact with the dielectric layer.

(Cathode Body)

A metal foil may be used for the cathode body. The type of the metal constituting the metal foil is not particularly limited. Examples of the metal constituting the metal foil include valve metals such as aluminum, tantalum, niobium, and titanium, and alloys of valve metals. Preferable examples are aluminum and an aluminum alloy. A surface of the cathode body may be provided with a chemical formation film, or may be provided with a coating of a metal (dissimilar metal) different from the metal constituting the cathode body or a coating of a non-metal. Examples of the dissimilar metal and the non-metal include metals such as titanium, and non-metals such as carbon.

(Separator)

A sheet-like material that can be impregnated with an electrolyte may be used for the separator. For example, a sheet-like material that is insulating and can be impregnated with an electrolyte may be used. The separator may be a woven fabric, a non-woven fabric, or a porous film. In any case, the separator has voids. Examples of the material of the separator include cellulose, polyethylene terephthalate, polybutylene terephthalate, polyphenylene sulfide, vinylon, nylon, aromatic polyamide, polyimide, polyamide imide, polyetherimide, rayon and glass.

(Electrolyte)

The electrolyte of the electrolytic capacitor according to the present disclosure typically includes a non-aqueous solvent. The electrolyte may include an electrolytic solution (non-aqueous electrolytic solution) containing a non-aqueous solvent and a base component dissolved in the non-aqueous solvent, or may be composed of the electrolytic solution. That is, the electrolyte of the electrolytic capacitor according to the present disclosure may include a liquid component. In the following, the liquid component (a non-aqueous solvent or an electrolytic solution) included in the electrolyte may be referred to as a "liquid component (L)". Note that as used herein, the liquid component (L) may be a component that is liquid at room temperature (25° C.), or may be a component that is liquid at the temperature at which the electrolytic capacitor is used.

The non-aqueous solvent included in the electrolyte may be an organic solvent, or may be an ionic liquid. Examples of the non-aqueous solvent includes polyhydric alcohols such as ethylene glycol and propylene glycol, cyclic sulfones such as sulfolane (SL), lactones such as γ-butyrolactone (γBL), amides such as N-methyl acetamide, N,N-dimethylformamide, and N-methyl-2-pyrrolidone, esters such as methyl acetate, carbonate compounds such as propylene carbonate, ethers such as 1,4-dioxane, ketones such as methyl ethyl ketone, and formaldehyde.

Also, a polymer solvent may be used as the non-aqueous solvent. Examples of the polymer solvent include polyalkylene glycol, a derivative of polyalkylene glycol and a compound obtained by substituting at least one hydroxyl group of a polyhydric alcohol with polyalkylene glycol (including a derivative thereof). Specific examples of the polymer solvent include polyethylene glycol (PEG), polyethylene glycol glyceryl ether, polyethylene glycol diglyceryl ether, polyethylene glycol sorbitol ether, polypropylene glycol, polypropylene glycol glyceryl ether, polypropylene glycol diglyceryl ether, polypropylene glycol sorbitol ether, and polybutylene glycol. Additional examples of the polymer solvent include an ethylene glycol-propylene glycol copolymer, an ethylene glycol-butylene glycol copolymer, and a propylene glycol-butylene glycol copolymer. The non-aqueous solvent may be used alone or in a combination of two or more.

As described above, the electrolyte may include a non-aqueous solvent, and a base component (base) dissolved in the non-aqueous solvent. Also, the electrolyte may include a non-aqueous solvent, and a base component and/or acid component (acid) dissolved in the non-aqueous solvent.

Polycarboxylic acid and monocarboxylic acid may be used as the acid component. Examples of the polycarboxylic acid include aliphatic polycarboxylic acid ([saturated polycarboxylic acid, e.g., oxalic acid, malonic acid, succinic acid, glutaric acid, adipic acid, pimelic acid, suberic acid, azelaic acid, sebacic acid, 1,6-decanedicarboxylic acid, 5,6-decanedicarboxylic acid]; [unsaturated polycarboxylic acid, e.g., maleic acid, fumaric acid, itaconic acid]), aromatic polycarboxylic acid (e.g., phthalic acid, isophthalic acid, terephthalic acid, trimellitic acid, pyromellitic acid), and alicyclic polycarboxylic acid (e.g., cyclohexane-1,2-dicarboxylic acid, cyclohexene-1,2-dicarboxylic acid, etc.).

Examples of the monocarboxylic acid include aliphatic monocarboxylic acid (having 1 to 30 carbon atoms) ([saturated monocarboxylic acid, e.g., formic acid, acetic acid, propionic acid, butyric acid, isobutyric acid, valeric acid, caproic acid, enanthic acid, caprylic acid, pelargonic acid, lauryl acid, myristic acid, stearic acid, behenic acid]; [unsaturated monocarboxylic acid, e.g., acrylic acid, methacrylic acid, oleic acid]), aromatic monocarboxylic acid (e.g., benzoic acid, cinnamic acid, naphthoic acid), and oxycarboxylic acid (e.g., salicylic acid, mandelic acid, resorcinol acid).

Among these, maleic acid, phthalic acid, benzoic acid, pyromellitic acid, and resorcinol acid are thermally stable, and can be preferably used.

An inorganic acid and/or an organic acid may be used as the acid component. Examples of typical inorganic acids include phosphoric acid, phosphorous acid, hypophosphorous acid, boric acid, fluoroboric acid, tetrafluoroboric acid, and hexafluorophosphoric acid. Examples of typical organic acids include alkanesulfonic acid such as methanesulfonic acid, alkanolsulfonic acid such as phenolsulfonic acid and cresolsulfonic acid, benzenesulfonic acid, naphthalenesulfonic acid, alkylphosphoric acid ester, benzenesulfonic acid, and naphthalenesulfonic acid. Also, a composite compound of an organic acid and an inorganic acid may be used as the acid component. Examples of such a composite compound include borodiglycolic acid, borodioxalic acid, and borodisalicylic acid.

The base component may be a compound having an alkyl-substituted amidine group, and may be, for example, an imidazole compound, a benzimidazole compound, an alicyclic amidine compound (a pyrimidine compound and an imidazoline compound). Specifically, 1,8-diazabicyclo[5,4,0]undecene-7,1,5-cliazabicyclo[4,3,0]nonene-5,1,2-dimethylimidazolinium, 1,2,4-trimethylimidazoline, 1-methyl-2-ethyl-imidazoline, 1,4-dimethyl-2-ethylimidazoline, 1-methyl-2-heptylimidazoline, 1-methyl-2-(3'heptyl)imidazoline, 1-methyl-2-dodecylimidazoline, 1,2-dimethyl-1,4,5,6-tetrahydropyrimidine, 1-methylimidazole, and 1-methylbenzimidazole are preferable. By using these compounds, a capacitor exhibiting excellent impedance performance can be obtained.

A quaternary salt of a compound having an alkyl-substituted amidine group may be used as the base component. Examples of such a base component include an imidazole compound, a benzimidazole compound, and an alicyclic amidine compound (a pyrimidine compound and an imidazoline compound), which are quaternized with an alkyl group or an arylalkyl group having 1 to 11 carbon atoms. Specifically, 1-methyl-1,8-diazabicyclo[5,4,0]undecene-7, 1-methyl-1,5-diazabicyclo[4,3,0]nonene-5,1,2,3-trimethylimidazolinium, 1,2,3,4-tetramethylimidazolinium, 1,2-dimethyl-3-ethyl-imidazolinium, 1,3,4-trimethyl-2-ethylimidazolinium, 1,3-dimethyl-2-heptylimidazolinium, 1,3-dimethyl-2-(3'heptyl)imidazolinium, 1,3-dimethyl-2-dodecylimidazolinium, 1,2,3-trimethyl-1,4,5,6-tetrahydropyrimiclium, 1,3-climethylimidazolium, 1-methyl-3-ethyl-imidazolium, and 1,3-dimethyl benzoimidazolium are preferable. By using these compounds, a capacitor exhibiting excellent impedance performance can be obtained.

Also, a tertiary amine may be used as the base component. Examples of the tertiary amine include trialkylamines (such as trimethylamine, dimethylethylamine, methyldiethylamine, triethylamine, dimethyl-n-propylamine, dimethylisopropylamine, methylethyl-n-propylamine, methylethylisopropylamine, diethyl-n-propylamine, diethylisopropylamine, tri-n-propylamine, triisopropylamine, tri-n-butylamine, and tri-tert-butylamine) and phenyl group-containing amines (such as dimethylphenylamine, methylethylphenylamine, and diethylphenylamine). In particular, trialkylamines are preferable in view of increased conductivity of the electrolyte, and it is more preferable to include at least one selected from the group consisting of trimethylamine, dimethylethylamine, methyldiethylamine, and triethylamine. Also, a secondary amine such as dialkylamine, a primary amine such as monoalkylamine, and ammonia may be used as the base component.

The liquid component (L) may contain a salt of the acid component and the base component. The salt may be an inorganic salt and/or an organic salt. An organic salt is a salt in which at least one of the anion and the cation contains an organic material. For example, trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate may be used as the organic salt.

In the electrolytic capacitor according to the present disclosure, the amount of the base component in the electrolytic solution may be 0.1 mass % or more an 20 mass % or less. When the amount of the base component is 0.1 mass % or more, it is particularly important to use conductive particles. When the amount of the base component is 20 mass % or less, the base component can be easily dissolved in the electrolytic solution.

In the electrolytic capacitor, it is important that the ESR is low. A reduced ESR can be achieved by using an electrolyte including a conductive polymer doped with a dopant. However, in the case of using an electrolyte including a conductive polymer doped with a dopant and the liquid component (L), the ESR is initially low, but may increase over time. From the viewpoint of suppressing such increase of the ESR, an electrolyte that does not include a conductive polymer may be used. Alternatively, an electrolytic solution in which dedoping is less likely to occur may be used. To achieve these, it is preferable to use a separator coated with the metal oxide (M).

The electrolyte may include a conductive polymer in addition to the liquid component (L) (e.g., an electrolytic solution). Examples of the conductive polymer include polypyrrole, polythiophene, polyfuran, polyaniline, polyacetylene, and derivatives thereof. The derivatives include polymers including polypyrrole, polythiophene, polyfuran, polyaniline, or polyacetylene as the basic skeleton. For example, a derivative of polythiophene includes poly(3,4-ethylenedioxythiophene). These conductive polymers may be used alone, or a plurality of these may be used in a combination. Also, the conductive polymer may be a copolymer of two or more types of monomers. The weight-average molecular weight of the conductive polymer is not particularly limited, and may be in the range of 1000 to 100000, for example. A preferable example of the conductive polymer is poly(3,4-ethylenedioxythiophene) (PEDOT).

The conductive polymer may be doped with a dopant. From the viewpoint of suppressing dedoping of the dopant from the conductive polymer, it is preferable to use a polymer dopant as the dopant. Examples of the polymer dopant include polyvinylsulfonic acid, polystyrenesulfonic acid, polyallylsulfonic acid, polyacrylicsulfonic acid, polymethacrylsulfonic acid, poly(2-acrylamide-2-methylpropanesulfonate), polyisoprenesulfonic acid, and poly(acrylic acid). These may be used alone or in a combination of two or more. These may be included in the electrolyte in the form of a salt. A preferable example of the dopant is polystyrenesulfonic acid (PSS).

In the electrolytic capacitor according to the present disclosure, the dopant may be an acidic group-containing dopant, or may be an acidic group-containing polymer dopant. Examples of the acidic group include a sulfonic acid group and a carboxyl group. The acidic group-containing polymer dopant is a polymer in which at least some of the constituent units contain an acidic group. Examples of such a polymer dopant include the above-described polymer dopants.

The weight-average molecular weight of the dopant is not particularly limited. From the viewpoint of facilitating formation of a homogeneous electrolyte, the weight-average molecular weight of the dopant may be in the range of 1000 to 100000.

In the electrolytic capacitor according to the present disclosure, the dopant may be polystyrenesulfonic acid, and the conductive polymer may be poly(3,4-ethylenedioxythiophene). That is, the electrolyte may include poly(3,4-ethylenedioxythiophene) doped with polystyrenesulfonic acid.

In the case of using a conductive polymer doped with a dopant, the pH of the liquid component (L) may be less than 7, or may be 5 or less (e.g., the range of 2 to 4.5), in order to suppress dedoping of the dopant.

(Production Method of Electrolytic Capacitor)

A method for producing an electrolytic capacitor according to the present disclosure will be described below. With this production method, it is possible to produce the electrolytic capacitor according to the present disclosure. Note that the matters described in relation to the electrolytic capacitor according to the present disclosure can be applied to the following production method, and therefore any redundant description may be omitted. For example, the constituent elements and the like of the capacitor element have been described above, and therefore redundant descriptions thereof may be omitted. In addition, the matters described in relation to the production method below can be applied to the above-described electrolytic capacitor.

A production method according to the present disclosure is a production method of an electrolytic capacitor including: an anode body; a dielectric layer formed on the anode body; a cathode body; a separator; and an electrolyte. The production method includes step (i) of forming a capacitor element by arranging the anode body, the cathode body, the separator, and the electrolyte such that the separator and the electrolyte are disposed between the dielectric layer and the cathode body. As described above, at least part of the separator is coated with the conductive metal oxide (M).

There is no particular limitation on the step (i), and any known method may be used. An example of the step (i) may include: step (i-a) of arranging the anode body, the cathode body, and the separator such that the separator is disposed between the dielectric layer and the cathode body; and step (i-b) of impregnating the separator with the electrolyte. In the step (i-b), the electrolyte is disposed between the dielectric layer and the cathode body. An example of the step (i-a) is performed by winding or stacking the anode body in the form of a foil, the cathode body in the form of a foil, and the separator such that the separator is disposed between the anode body having the dielectric layer formed thereon and the cathode body. That is, the capacitor element may be a stacked capacitor element, or may be a wound capacitor element.

The step (i-b) may be performed by immersing, in an electrolyte (e.g., electrolytic solution), a structure (a stacked structure, a wound structure, etc.) that has been formed in the step (i-a). When the electrolyte includes a conductive polymer (and optionally a dopant), the step (i-b) may be performed by immersing the structure formed in the step (i-a) in a dispersion in which the conductive polymer (and optionally the dopant) is dispersed. There is no particular limitation on the dispersing medium of the dispersion, and a known dispersing medium may be used. For example, as the dispersing medium, an aqueous liquid containing water may be used, or water may be used. The immersing step (the immersing step in the step (i-b)) may be performed only once, or may be performed a plurality of times. After the immersing step, a heat-treating step may be performed.

After the separator has been impregnated with the conductive polymer, a step of impregnating the separator with the liquid component (L) may be performed. There is no particular limitation on the impregnation method, and a known method may be used. For example, a structure (a stacked structure, a wound structure, etc.) in which the conductive polymer is disposed may be immersed in a non-aqueous solvent (or an electrolytic solution).

The production method according to the present disclosure may include, before the step (i), step (a) and step (b) in this order. The step (a) is a step of coating at least part of the sheet, which is to be cut to form the separator, with the metal oxide (M). The step (b) is a step of forming the separator by cutting the sheet.

There is no particular limitation on the step (a), and a known method may be used. For example, a dry process (sputtering, evaporation, etc.) may be used, or a wet process (a process using a treating solution) may be used. Both a dry process and a wet process are known as methods for forming indium tin oxide, zinc oxide, and antimony-doped tin oxide, and therefore these method may be used. In the case of coating at least part of the separator with the metal oxide (M) using a dry process, the amount of the metal oxide (M) attached to one side of the separator can easily be made larger than the amount of the metal oxide (M) attached to the other side of the separator.

Examples of the wet process include a gravure method, a slot-die method, a bank coating method, an inkjet method, and a dipping method. By using the wet process, the entire separator can be coated with the metal oxide (M). In a preferable example, the entire separator is coated with the metal oxide (M) in a substantially uniform coating amount. On the other hand, even in the case of using a wet process, the metal oxide (M) can be unevenly distributed by using a separator whose porosity (density) varies from one portion to another.

The production method according to the present disclosure may include, after the step (a) (e.g., between the step (a) and the step (b), a step of crystallizing the metal oxide (M). By crystallizing the metal oxide (M) (e.g., indium tin oxide), it is possible to increase the conductivity of the metal oxide (M). The crystallization can be performed, for example, by heat-treating the sheet that has been coated with the metal oxide (M) in the step (a). The heat treatment conditions may be selected according to the type of the metal oxide (M). For example, when the metal oxide (M) is indium tin oxide, the heat treatment may be performed for 1 to 60 minutes at a temperature within the range of 150 to 300° C.

In the step (a), the at least part of the sheet may be coated with the metal oxide (M) between a roll for feeding out the sheet and a roll for taking up the sheet. This configuration allows the metal oxide (M) to be efficiently attached to the sheet. As this method, a so-called role-to-role method may be used. In this case, the coating with the metal oxide (M) may be performed by a dry process, or may be performed by a wet process. In a dry process, the coating with the metal oxide (M) is generally performed in a decompression chamber. In that case, the roll for feeding out the sheet and the roll for for taking up the sheet may be disposed in the decompression chamber.

If necessary, leads are connected to the capacitor element formed in the step (i), and the capacitor element is sealed with a sealing resin, and enclosed in a case, for example. In this manner, an electrolytic capacitor is produced.

In the following, an exemplary embodiment of the electrolytic capacitor according to the present disclosure will be described with reference to the drawings. However, the electrolytic capacitor of the present disclosure is not limited by the following drawings. The above-described constituent elements can be applied to constituent elements of an exemplary electrolytic capacitor described below. The constituent elements of the exemplary electrolytic capacitor described below can be changed based on the above description. The matters described below may be applied to the above-described embodiment.

Embodiment 1

Figure 2:
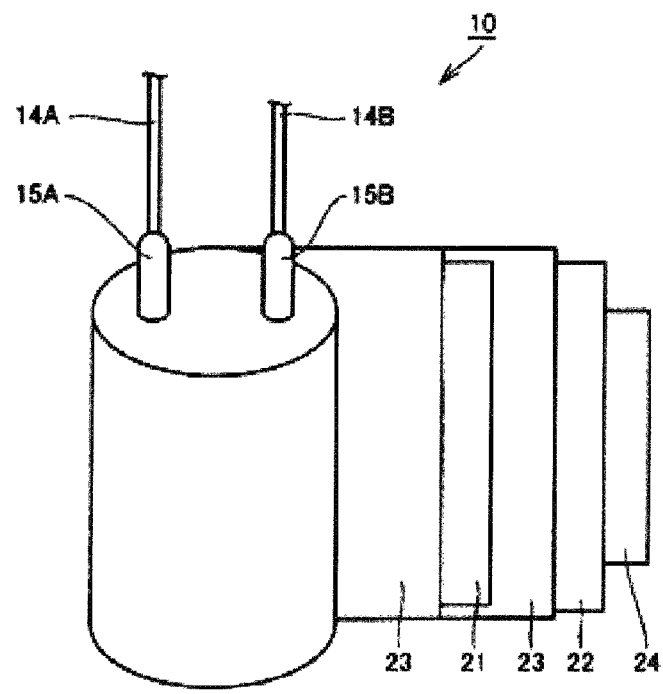
FIG. 2 is a diagram schematically showing part of the electrolytic capacitor shown in FIG. 1.

In Embodiment 1, an example of the electrolytic capacitor according to the present disclosure will be described. The electrolytic capacitor is an electrolytic capacitor including a first capacitor element. FIG. 1 schematically shows a cross section of an example of an electrolytic capacitor 100 according to Embodiment 1. FIG. 2 is a partial development schematically showing a capacitor element 10 included in the electrolytic capacitor 100 shown in FIG. 1.

As shown in FIG. 1, the electrolytic capacitor 100 includes a capacitor element 10, a bottomed case 11 that accommodates the capacitor element 10, a sealing member 12 that closes the opening of the bottomed case 11, a seat plate 13 that covers the sealing member 12, lead wires 14A and 14B that are lead out from the sealing member 12 and penetrate the seat plate 13, and lead tabs 15A and 15B that respectively connect the lead wires 14A and 14B to electrodes of the capacitor element 10. The capacitor element 10 is accommodated in the bottomed case 11. A portion near the opening of the bottomed case 11 is drawn inward, and the opening end of the bottomed case 11 is curled so as to crimp the sealing member 12.

Referring to FIG. 2, the capacitor element 10 includes an anode body 21 in the form of a foil, with a dielectric layer (not shown) formed on a surface thereof, a cathode body 22 in the form of a foil, and a separator 23 and an electrolyte (not shown) that are disposed therebetween. The anode body 21 and the cathode body 22 are wound with the separator 23 disposed therebetween. The outermost circumference of the wound structure is fixed with an unwinding prevention tape 24. Note that FIG. 2 is a partial development of the wound structure before the outermost circumference thereof is fixed. As described above, at least part of the separator 23 is coated with the metal oxide (M).

INDUSTRIAL APPLICABILITY

The present disclosure is applicable to an electrolytic capacitor and a production method thereof.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10 . . . . Capacitor element
21 . . . . Anode body
22 . . . . Cathode body
23 . . . . Separator
100 . . . . Electrolytic capacitor

The invention claimed is:

1. An electrolytic capacitor comprising:
an anode body;
a dielectric layer formed on the anode body;
a cathode body; and
a separator and an electrolyte that are disposed between the dielectric layer and the cathode body,
wherein at least part of the separator is coated with a conductive metal oxide, and
an amount of the metal oxide coating a portion of the separator on the cathode body side is larger than an amount of the metal oxide coating a portion of the separator on the anode body side.

2. The electrolytic capacitor according to claim 1,
wherein the metal oxide includes an oxide of at least one element selected from the group consisting of indium, tin, antimony, and zinc.

3. The electrolytic capacitor according to claim 1,
wherein the separator includes synthetic fiber.

4. The electrolytic capacitor according to claim 1,
wherein the electrolyte includes an electrolytic solution and a conductive polymer.

5. The electrolytic capacitor according to claim 1,
wherein the cathode body includes a metal foil.

6. The electrolytic capacitor according to claim 1, further comprising
a conductive layer formed on a surface of the cathode body on the separator side, the conductive layer including at least one element selected from the group consisting of carbon, titanium, and nickel.

7. A production method of an electrolytic capacitor including: an anode body; a dielectric layer formed on the anode body; a cathode body; a separator; and an electrolyte, the method comprising:
step (i) of forming a capacitor element by arranging the anode body, the cathode body, the separator, and the electrolyte such that the separator and the electrolyte are disposed between the dielectric layer and the cathode body,
wherein at least part of the separator is coated with a conductive metal oxide,
the production method further comprising:
before the step (i),
step (a) of coating at least part of a sheet, which is to be cut to form the separator, with the metal oxide;
step (b) of forming the separator by cutting the sheet; and
after the step (a), a step of crystallizing the metal oxide.

8. The production method according to claim 7,
wherein, in the step (a),
the at least part of the sheet is coated with the metal oxide between a roll for feeding out the sheet and a roll for taking up the sheet.

* * * * *